United States Patent [19]
Schatz

[11] Patent Number: 4,593,749
[45] Date of Patent: Jun. 10, 1986

[54] PROCESS FOR INCREASING THE HEAT FLOW DENSITY OF HEAT EXCHANGERS WORKING WITH AT LEAST ONE HIGH-VELOCITY GASEOUS MEDIUM, AND A HEAT EXCHANGER APPARATUS FOR UNDERTAKING THE PROCESS

[76] Inventor: Oskar Schatz, Tellhöhe 14, D-8031 Stockdorf, Fed. Rep. of Germany

[21] Appl. No.: 432,908
[22] PCT Filed: Feb. 1, 1982
[86] PCT No.: PCT/DE82/00020
§ 371 Date: Sep. 29, 1982
§ 102(e) Date: Sep. 29, 1982
[87] PCT Pub. No.: WO82/02740
PCT Pub. Date: Aug. 19, 1982

[30] Foreign Application Priority Data
Jan. 30, 1981 [DE] Fed. Rep. of Germany ....... 3103199

[51] Int. Cl.[4] ............................................. F28F 13/06
[52] U.S. Cl. .......................................... 165/1; 165/34; 165/38; 165/39; 165/40; 165/41; 165/51; 165/101; 165/102
[58] Field of Search ................................ 165/34–41, 165/51–52, 101–103, 1; 237/12.3 B; 126/247

[56] References Cited

U.S. PATENT DOCUMENTS

| | | | |
|---|---|---|---|
| 2,749,050 | 6/1956 | Booth | 237/12.3 B |
| 3,186,394 | 6/1965 | Ramun | 165/51 X |
| 3,406,745 | 10/1968 | De Castelet | 165/40 |
| 3,450,197 | 6/1969 | Fieni | 165/51 X |
| 3,779,307 | 12/1973 | Weiss et al. | 165/35 X |
| 3,920,067 | 11/1975 | Schindler et al. | 165/38 |
| 4,149,390 | 4/1979 | Iijima | 165/40 X |
| 4,264,826 | 4/1981 | Ullmann | 126/247 X |
| 4,337,737 | 7/1982 | Pechner | 165/40 X |
| 4,384,673 | 5/1983 | Carson | 165/101 X |
| 4,386,734 | 6/1983 | Weible | 237/12.3 B |

FOREIGN PATENT DOCUMENTS

| | | | |
|---|---|---|---|
| 787684 | 6/1968 | Canada | 165/51 |
| 932381 | 7/1963 | United Kingdom | 165/103 |

*Primary Examiner*—Sheldon J. Richter
*Attorney, Agent, or Firm*—Harness, Dickey & Pierce

[57] ABSTRACT

A method and apparatus are disclosed for increasing the heat flow density of heat exchangers having at least one gaseous fluid flowing therethrough at a high velocity. In one form of the method, which may be used in motor vehicles, the energy for the acceleration of the gaseous fluid is taken from the exhaust gases of an internal combustion engine. In this respect, an exhaust gas heat exchanger used for vehicle interior heating, or a heat exchanger used for cooling the engine coolant, may be used. In order to increase the energy content of the exhaust gas, the exhaust gas undergoes a pressure build-up. The waste heat of the exhaust gas may thus be used at low engine loads, with a relatively low need for engine cooling and a relatively high need for interior heating, in order to increase the heat flow density at the exhaust gas heat exchanger for vehicle heating. While at high engine loads with a relatively small need for interior heating energy, but with a high need for engine cooling, the exhaust gas may be used for increasing the heat flow density in the radiator. Preferably, the heat exchanger system for heating the vehicle includes a selectively operable pressure build-up unit in the flow path for the exhaust gas.

19 Claims, 11 Drawing Figures

PROCESS FOR INCREASING THE HEAT FLOW DENSITY OF HEAT EXCHANGERS WORKING WITH AT LEAST ONE HIGH-VELOCITY GASEOUS MEDIUM, AND A HEAT EXCHANGER APPARATUS FOR UNDERTAKING THE PROCESS

BACKGROUND AND SUMMARY OF THE INVENTION

The invention pertains to a process for increasing the heat flow density of heat exchangers employing at least one high-velocity gaseous medium, and to a heat exchanger apparatus for undertaking the process.

Because of the decreasing importance of air-cooled automobile engines, there has in recent years been a great decrease in the use of exhaust gas heat for heating the interiors of such vehicles. In vehicles using water-cooled engines, it is simple for the radiator water to be used as a source of energy for interior heating. However, in view of steps being taken for increasing mileage in automobile engineering, there has come to be less and less waste heat from the cooling system of the engine which can be used for this purpose. In view of this, especially in the case of high efficiency engines, it is frequently no longer possible for all the interior and other heating needs of a vehicle to be covered without the use of back-up heating system.

In order to increase the amount of heat transferred by the engine to the engine coolant, a pressure build-up in the exhaust gases has been used. As a result, however, the mileage is decreased, and the temperature of the exhaust gases and the emission of noxious substances is increased. The only source of waste heat which may still be realistically used as a source of energy for such interior heating needs, is the heat of the exhaust gases. If the exhaust gas heat is recovered by a gas-water heat exchanger and thus made part of the heating and cooling system of the vehicle, the mileage and the emission of exhaust gases can be improved because of the increase in the temperature level of the engine.

Some of the earlier shortcomings experienced with exhaust gas heat exchangers, such as cracks caused by thermal stresses and decomposition of the anti-freeze liquid or other engine coolant, have been overcome by providing the exhaust gas-water heat exchanger in a bypass of the exhaust gas system, with the heat exchanger being exposed to exhaust gas only when necessary to get the desired heating effect, and with the water or coolant constantly running through the heat exchanger to keep it at a more or less constant temperature.

The main shortcoming of such heat exchangers has, however, been the dependency of the usable waste heat of the exhaust gas on the engine power output, such power output varying over a wide power ratio of about 200 to 1 in the case of diesel and gasoline engines, for example. Because the amount of usuable heat of the engine coolant is dependent on the engine power output as well, the need for a stepped-up heating effect is highest in those cases in which there is the least usable waste heat of the exhaust gas, thus necessitating large-area and heavy heat exchangers that take up much space. This tendency goes against current attempts to down-size and reduce the weight of a vehicle and the decrease, going hand in hand therewith, in the space on hand. Therefore, since the amount and temperature of the exhaust gas is relatively low at low engine output, it is desirable to increase the exhaust gas heat flow density by other measures.

One way of increasing the exhaust gas heat flow density is to increase the velocity of the exhaust gas contacting the heat exchanger surface. By increasing the velocity of the exhaust gas flow, the heat transmission coefficient (k-value) is increased, which especially in the case of gases is a function of the flow velocity. Also, the price, overall size, and weight of the heat exchanger are greatly dependent on the heat transmission coefficient.

However, there are economic limits to the degree to which the exhaust gas velocity may be increased because such increases in velocity generally mean that the flow cross-sections are decreased. In order to obtain the higher pressure difference necessary for the higher flow velocity, it is necessary for gas blowers and blower drives to be made larger and more complex. Furthermore, the operating costs are greatly increased by the higher use of energy.

In motor vehicles, such as private passenger automobiles, the manner in which the flow velocity in such heat exchangers is increased is especially important because of undesired effects on costs, weight and overall size of the vehicle and because of the power needed to operate the blower. It is first necessary to make certain that the required blower power is supplied to the blower drive, thus making a more powerful dynamo necessary and in turn being responsible for an undesired increase in weight and an undesired increase in the overall size of the vehicle. The most important factor in connection with the operation of a high pressure blower is, however, the especially poor efficiency typically obtained in connection with producing the necessary driving power. It is necessary for the pressure energy, which is needed for increasing the component speeds through the system, to be increased many times, and furthermore the efficiency in a motor vehicle is very poor because a number of components or systems with poor efficiency are interrelated or interconnected with a multiplicative effect on the overall vehicle efficiency. The chain is made up of the links, that is to say: higher pressure energy times worse efficiency of the centrifugal blower times poor efficiency of the blower drive times poor efficiency of the dynamo times poor efficiency of the vehicle engine. Such effects thus have the multiplicative effect of reducing the overall efficiency of the vehicle.

Because a high fluid velocity has previously been found to be uneconomical, automobile heat exchangers have frequently been designed for the lowest possible pressure loss, that is to say the lowest possible flow velocity. For this reason, the normal heat transmission coefficients (k-values) in automobile engineering are generally 20 to 50 Watt/sq.m/degree Kelvin.

It is known for exhaust gas heat exchangers of motor vehicles with piston engines to be connected directly to the exhaust system of the engine so that a separate blower is unnecessary. Because such heat exchangers have generally been designed for low fluid pressures and velocities, such heat exchangers have been relatively conventionally designed. However, as will be made clear in the present specification, this is unnecessary because it has been found that the shortcomings noted above may be overcome if heat exchangers capable of a high heat flow density are provided.

The radiator of an automobile engine is a heat exchanger, whose previous weight and overall size have stood in the way of attempts at saving fuel. In order to save fuel, a decrease in vehicle weight and aerodynamic resistance is desired. For this reason, there is a need for smaller radiators with a lower weight. Meeting this need is possible by increasing the heat flow density of the heat exchanger used as the radiator.

For this reason, one purpose of the invention is that of economically increasing the heat flow density of heat exchangers having at least one gaseous medium flowing through them at a high velocity. This is accomplished without costly measures being necessary for producing high pressures and/or high velocities through the heat exchanger, without unduly adding to the technical complexity of such heat exchangers, and furthermore without increasing the amount of energy used by, and the weight and overall size of, the vehicle. Decreasing the weight and overall size of the vehicle is especially desirable in automobile engineering.

In the case of the process and apparatus described herein, the above purpose may be effected if the energy for acceleration of the gaseous medium is taken from the exhaust gases of an internal combustion engine. From this it may be seen that an energy supply can be provided with only low equipment costs and with low energy consumption because the energy needed may be supplied in the form of otherwise wasted energy.

Preferably, the invention may be used in heat exchangers for motor vehicle interior heating. A useful development of the invention may be produced by increasing the energy content of the exhaust gas by causing a pressure build-up in the exhaust gas. As discussed above, there is a further need for heat energy especially when the engine is running with a small load. In contrast to the operation of a conventional heat exchanger, another purpose of the present invention is that at a low load on the engine high heat flow densities may be produced, while at medium engine load, the lowest possible heat flow densities are produced.

Because of the above-mentioned pressure build-up, the exhaust gas temperature is increased, thus desirably increasing heat transfer at the exhaust gas heat exchanger; while on the other hand the coolant water temperature is also increased, thus increasing the heat transfer for normal vehicle heating. If the pressure build-up is produced within, or at the inlet of, the heat exchanger, high exhaust gas velocities along the heat exchanger surfaces will be produced even at low engine output, and low velocities are produced by reducing the pressure build-up at high engine powers. The compression power needed for producing higher exhaust gas velocities, is produced by the engine itself through the gas pressure build-up. Thus, due to the exhaust gas pressure build-up at a low engine load, the density and the temperature of the exhaust gases are increased and the transmission of heat from the engine to the engine coolant is stepped up.

As a further useful development of the invention, the exhaust gases of the internal combustion engine can be fed into a pump apparatus (used for accelerating a gaseous medium) in order to cause the exhaust gases to give up their kinetic energy. According to one form of the invention in which the heat exchanger for cooling an engine coolant has a gaseous medium flowing therethrough, the pump apparatus can be turned on or put into the circuit whenever the coolant temperature exceeds a predetermined value.

Exhaust gas heat exchangers of conventional design have the shortcoming that their efficiency goes up with increasing engine loads at which they are less frequently needed, and their efficiency goes down with decreasing engine loads at which they are more frequently needed.

The use of waste energy from engine exhaust gases for increasing the heat flow density in heat exchangers for vehicle interior and other heating, and the use of heat exchangers for cooling an internal combustion engine, results in an increased heat availability for heating purposes at low engine loads, while in this condition of operation an increase in the heat flow density at the radiator is not necessary. On the other hand, at a high engine load there is a desire to get a better cooling effect by increasing the heat flow density in the radiator, while in this condition of operation there is no need for further heating energy. Between these two conditions of operation there are intermediate conditions in which there is no need for a stepped-up cooling or a stepped-up heating effect.

As part of another useful development in the invention, a heat exchanger system for use in the invention may have a heat exchanger placed in the flow path of the exhaust gas and a pressure build-up unit that may be selectively operated, or selectively put into and taken out of the circuit. As part of one especially useful form of the invention, the duct for the gaseous medium of the heat exchanger is of such a size that between the inlet and the outlet for the gaseous medium, a pressure difference of approximately 0.01 and 0.5 bar and a flow velocity of approximately 50 to 200 m/sec. are obtained.

Such a heat exchanger design, which in its size or dimensions is different than normally-used heat exchangers, makes it possible for a heat exchanger system to be well matched to conditions of use in motor vehicles, because it is especially designed for the middle part of the engine load range. In such load ranges, the transmission of heat to the coolant of the engine is not adequate for the heating needs, while on the other hand the waste heat in the exhaust gas is adequate to meet the eating needs, so that the use of the pressure build-up unit is generally not necessary in this high load condition of operation. At least one form of the heat exchangers disclosed herein, with a flow velocity greater than that of normal heat exchangers, creates a very intensive effect so that it is herein referred to as an "intensive heat exchanger". The increase in exhaust gas pressure necessary for operation of the intensive heat exchangers does not make any changes necessary in the exhaust gas and engine systems. The energy for the compression of the exhaust gases is supplied by the engine itself. Because of the compression of the exhaust gases there is an increase in fuel consumption. However, such increase is small, because the compressor efficiency of the piston engine is much better than that of a centrifugal compressor, and because there is no need for an electric motor for driving a blower and thus there is a lower load on the generator or dynamo and the engine losses are changed into useful heat, but for a loss by radiation of about 10%. It may be seen from this that the mileage of the engine only decreases a very small amount that is negligible within the limits of measuring accuracy. Changes in the design of the exhaust and engine system are not therefore deemed necessary.

At low engine loads, an intensive heat exchanger is of nearly no effect because of the low temperature of the exhaust gases and because of the decrease in the heat transmission coefficient (k-value). The decrease in the k-value is because the exhaust gas volumes at low engine loads are much lower than at medium loads so that the flow velocity through the heat exchanger goes down and, because of this, the k-value decreases. Because of the low resistance to flow through the heat exchanger, however, there is generally no decrease in mileage at such engine loads. At high engine loads, however, the exhaust gas volumes and temperatures are much greater than at medium loads. For this reason, a large amount of heat is available in the exhaust gas system, and the heat exchanger is very efficient because of the high flow velocities. Such efficiency is further increased by friction effects and by the higher density of the exhaust gases in connection with the exhaust gas pressure build-up resulting from the higher velocity. Furthermore, in conditions of operation with a high engine load, enough waste heat will be present in the coolant from the engine for heating the vehicle, and the function of the exhaust gas heat exchanger is thus not necessary in this case. Therefore, because of the great amount of heat at the intensive heat exchanger at high engine loads, the heat exchanger must be bypassed by the exhaust gases. As a signal for the bypass condition, it is possible to make use of the throttle of the carburetor (in the case of a carburetor engine) or the position of the control rod of an injection pump (in the case of a fuel injection engine), or the temperature of the exhaust gases.

On the other hand, because an intensive heat exchanger is of normally nearly no effect at a low engine load, the pressure build-up unit has to be used as part of the invention. Although, in such an intensive heat exchanger according to one form of the invention, the pressure build-up unit is necessary, such a heat exchanger has a lower overall size and a lower weight (with the effect of increasing the mileage and cutting down equipment costs) than normally-used heat exchangers because of the more narrow flow cross-sections used in producing the higher flow velocities.

The pressure build-up unit may be placed at any position along the flow path of the exhaust gases. However, in especially useful forms of the heat exchanger system of the invention, the pressure build-up unit is disposed at the heat exchanger in the form of a nozzle system, for example, on the side of the gas inlet into the heat exchanger. The nozzles direct the exhaust gas flow against the heat exchanger surface so that the velocity of the exhaust gas along the heat exchanger walls is increased, and thus higher heat flow densities, higher gas densities, and higher exhaust gas temperatures are obtained.

Another possible means for producing the pressure build-up is by making the exhaust gas flow duct in the heat exchanger of such a size that, between the inlet and outlet, there is a pressure difference of approximately 0.1 and 5 bar and a flow velocity equal to approximately 100 to 500 m/sec. In such a design or size of heat exchanger, the flow velocities are so high that a high velocity gradient is created in the flowing gas, thus producing the necessary friction for increasing the temperature of the gas and producing better heat transmission. Furthermore, because of the high flow velocities, relatively high pressure build-ups are produced so that there is a marked increase in the exhaust gas temperature from the engine, and the exhaust gas density is also greatly increased, thus increasing the heat transmission coefficient. The heat transmission coefficient increases generally as a function of the 0.8th power of the exhaust gas density. Because of internal friction, this design of heat exchanger is referred to herein as "a friction heat exchanger". The factors determining the heat flow density in a friction heat exchanger, the factors together taking effect are the high temperature difference caused by the pressure build-up effect, the high heat transmission coefficient resulting from the higher density, the high heat transmission coefficient resulting from the high flow velocity along the heat exchanger surface, and the high temperature resulting from internal friction of the gases or from friction of the gas on the heat exchanger surfaces.

Additional useful developments of the invention will become apparent from the description below and from the appended claims.

A more detailed account of the invention will now be given by way of some working examples of the heat exchanger system of the invention, as illustrated schematically in the drawings.

DETAILED DESCRIPTION OF THE PREFERRED EMBODIMENTS

Figure 1:
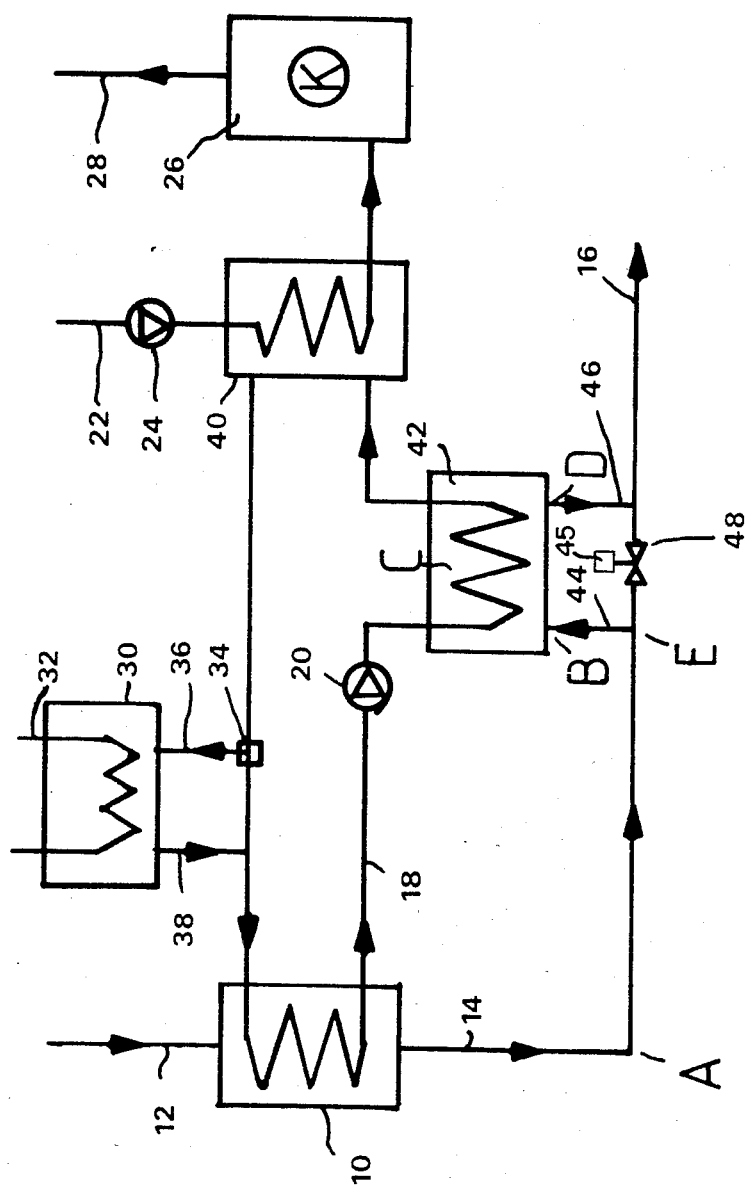
FIG. 1 is a diagrammatic view of a vehicle heating system having a back-up heating system according to the present invention.

FIG. 1 is a diagrammatic view of a heat exchanger in a motor vehicle heating system having a back-up heating system, which makes it possible for the heat exchanger to be operated at greater efficiency at a low engine power due to an increase in the heat flow density.

In FIG. 1 an internal combustion engine (especially a diesel engine) is numbered 10 while the supply for the combustion air is marked 12. The flow path for the engine exhaust gases, which are used as a medium giving up heat for the back-up heating system, is numbered 14 and is connected to an exhaust system 16. The coolant water circuit is numbered 18 and includes a water pump 20. Element 22 is the supply duct for the cooling or heating air with a blower 24. Element 26 is the passenger compartment through which the cooling or heating air flows as shown at flow path 28. Element 30 is the radiator for the engine cooling water or other liquid coolant, the flow path for the cooling air being indicated by reference numeral 32. A thermostatic valve 34 is adapted for switching, if necessary, the cooling water from the cooling circuit 18 to the radiator 30, by way of supply pipe 36 and return pipe 38. A heat exchanger 40 makes it possible for the air from the blower 34 to be heated by the engine cooling water. An exhaust gas heat exchanger 42 is connected by way of an inlet 44 and an outlet 46 to the exhaust system 16 so that the engine exhaust gases flow through the heat exchanger 42 when a bypass valve 48 is closed in the direct flow path 14 between the inlet 44 and the outlet 46. Alternatively, as discussed in more detail elsewhere herein, the bypass valve 48 may be opened, in overheating or heavy sooting conditions for example, to cause at least a substantial amount of the exhaust gas to bypass the heat exchanger. The valve 48 may be operated by any of a number of control means 45 known to those skilled in the art.

At high engine output powers, there will be enough heat in the exhaust gas for such back-up heating system. At lower engine output powers, the present invention increases the heating effect by providing a pressure build-up unit (described below) in the flow path 14 of the exhaust gas. This pressure build-up unit may be provided at various pressure build-up points, with the selection of a particular pressure build-up point having different effects in accordance with practical needs in a given installation. Exemplary embodiments of the heat exchanger 42, representing various pressure build-up points, are illustrated in the remaining figures of the drawings.

If the pressure build-up unit is provided between the engine 10 and the inlet 44 of the exhaust gas heat exchanger 42, as indicated by the reference letter A in FIG. 1, the exhaust gas temperature and the coolant water temperature will be increased by way of the two heat exchangers 40 and 42 of the vehicle heating system, there being generally no further effect at the exhaust gas heat exchanger 42. If, on the other hand, the pressure build-up is provided at the mouth of the inlet 44 into the heat exchanger 42, as indicated by reference letter B, there is not only an increase in the exhaust gas temperature and coolant water temperature, but furthermore there will be an increase in the exhaust gas density and flow velocity at the heat exchanger. This is because of a nozzle-like configuration (described below) of the pressure build-up unit in one embodiment of the invention, whereby the exhaust gas is directed against the heat transfer surface of the heat exchanger 42.

It is furthermore possible for a pressure build-up to be produced in the heat exchanger 42 itself by using the heat exchanger surfaces as a choke, this location of the pressure build-up "unit" being indicated diagrammatically by reference letter C in FIG. 1. In this way it is possible to get a high exhaust gas velocity (as is the case with pressure build-up point B), as well as a high temperature and a high density of the exhaust gas. The important useful effect achieved by pressure build-up points B and C is that in this way the heat exchanger surface may be kept relatively free of deposits, especially soot.

If the pressure build-up point is located at the outlet 46 of the exhaust gas heat exchanger 42, as indicated by reference letter D in FIG. 1, there is also an increased exhaust gas temperature, an increased exhaust gas density and a useful effect caused by post-expansion because the exhaust gas in the exhaust gas heat exchanger 42 has a higher temperature than the surrounding environment. After giving up heat in the exhaust gas heat exchanger 42, the exhaust gas is at a temperature that is still somewhat greater than the temperature of the incoming coolant water. At pressure build-up point D, and downstream therefrom, the exhaust gas expands to atmospheric pressure with a parallel cooling of the gas. For this reason, the temperature of the gas exiting into the atmosphere may be less than the inlet temperature of the coolant water, thus providing for a higher heat yield than for the other pressure build-up point described above.

Figure 2:
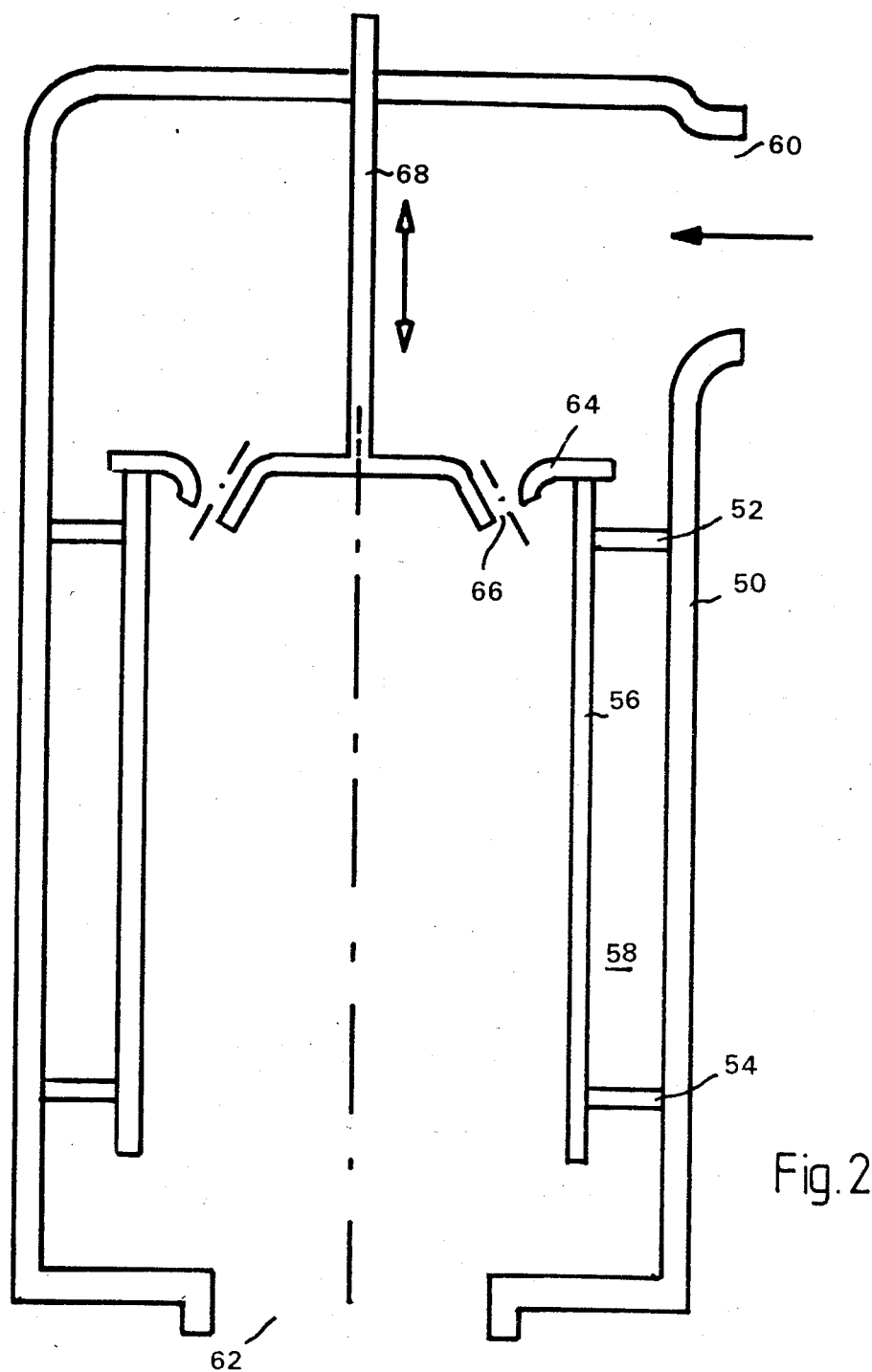
FIG. 2 is a diagrammatic sectional view through one example of a heat exchanger for use in the present invention.

FIG. 2 is a schematic sectional view of a heat exchanger for use at the pressure build-up point B. For simplicity of illustration, a heat exchanger with only one heat exchanger tube is illustrated. One skilled in the art will readily recognize that the principles illustrated (as also is the case with the later examples) are equally applicable for a number of heat exchanger tubes or with a heat exchanger surface of other desired forms.

The heat exchanger of FIG. 2 is made up of a cylindrical casing 50 in which a heat exchanger tube 56 is concentrically supported by support members 52 and 54. Between the casing 50 and the heat exchanger tube 56, a space 58 is provided for the coolant water. At one end of the casing 50 there is an inlet connector 60, and at the other end an outlet connector 62 for the engine exhaust gas. Furthermore, heat exchanger 56 has connections, opening into space 58, for the inlet of coolant water. Heat exchanger tube 56 includes a cross-wall 64 with nozzles 66, designed for producing exhaust gas pressure build-up, said cross-wall 64 being fixed on the inlet side of the heat exchanger tube 56 and being adapted to be lifted clear thereof by way of a driving member 68.

Nozzles 66 are so placed that the jet of exhaust gas is directed against the wall of the heat exchanger tube 56 when the cross-wall 64 with the nozzle is seat thereon. Dependent on the gas volume and the cross-sectional area of nozzle 66, there will be a greater or lesser pressure build-up in the exhaust gases, which causes a nozzle-like flow. By way of the nozzles, the pressure build-up of the exhaust gas causes an increase in the velocity of the exhaust gas along the heat exchanger wall surfaces and accordingly a higher heat flow density and a higher gas density and temperature. In the event of a heavy exhaust gas pressure build-up, these effects will be quite marked and have, however, an effect on the mileage or fuel consumption along with an increased transfer of heat to the coolant water.

Even with the large inner cross-sectional area of the heat exchanger tube 56, a backward flow is produced there because the high-velocity nozzle flow or jet is only present in part of the space near the walls. If the engine power is increased, then (more preferably automatically) the cross-wall 64 with the nozzles will be moved out of position or lifted so that the exhaust gases may pass directly from the inlet connector 60 into the heat exchanger tube 56 so that the exhaust flows through substantially all of the tube. Thus at medium engine power, if the exhaust gas flow velocities at the heat exchanger tube 56 are greater than at a lower engine power, the cross-wall 64 with the nozzles 66 thereon is returned to the operating position shown in FIG. 2.

Figure 3:
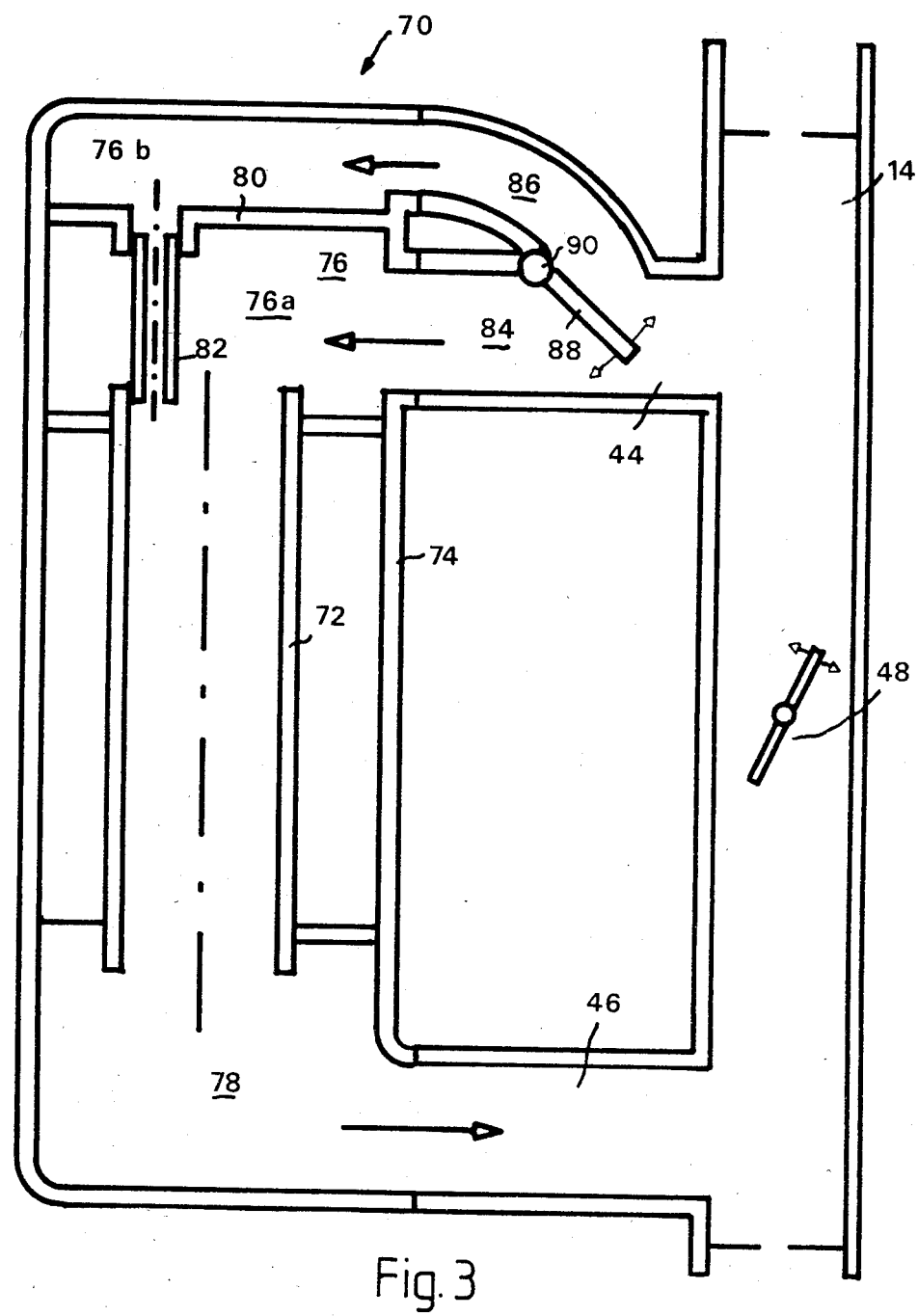
FIG. 3 is a diagrammatic sectional view similar to FIG. 2, of another example of a heat exchanger for use in the present invention.

The heat exchanger shown schematically in FIG. 3 provides a system for a stepless change-over between pressure build-up operation and normal operation. As was the case in FIG. 2, the heat exchanger 70 is illustrated for simplicity with only one heat exchanger tube 72 disposed concentric to casing 74 and having the coolant water flowing around it. The heat exchanger tube 72 communicates on the inlet side with an inlet space 76 and on the outlet side with an outlet space 78, which in turn is connected with the outlet 46.

Inlet space 76 has a cross-wall 80 extending partially thereacross so that inlet space 76 is walled off into a space portion 76a communicating directly with the heat exchanger tube 72, and into a pressure space portion 76b on the side of wall 80 facing away from heat exchanger tube 72. It is then possible for a flow to be produced from pressure space portion 76b, through the nozzle pipes 82 disposed in nozzle wall 80, and into the heat exchanger tube 72.

Upstream from inlet flow space 76, inlet 44 is branched into a branch 84 with a large cross-section opening into space portion 76a and a branch 86 with a small cross-section opening into pressure space portion 76b. At the point of the branching of inlet flow space 76, there is preferably a hinged door or flap (damper) 88 for changing the distribution of the exhaust gas flow to the heat exchanger 70 between the two branches 84 and 86. Upon closing off branch 84 with door 88, all the exhaust gas flows through the pressure space portion 76b and the nozzle pipe 82 into the heat exchanger tube 72. If branch 86 is closed off by door 88, all the exhaust gas flows by way of space portion 76a directly into the heat exchanger tube 72. The preferably hinged door 88 may be adjustably pivoted or otherwise moved by way of a driving member indicated diagrammatically by reference numeral 90 to intermediate positions in order to obtain the desired distribution of the exhaust gas flow between branches 84 and 86.

If, by way of adjustment of the position of door 88, the exhaust gas is directed through branch 84, operation of the heat exchanger will be conventional with an exhaust gas distribution more or less evenly over the cross-section of the heat exchanger tube 72. Upon closing off branch 84 by door 88, the cross-section of the flow path available to the exhaust gas is narrowed so that the exhaust gas undergoes a pressure build-up and flows with an increased velocity into the heat exchanger tube 72, at which point it is directed by the nozzle pipes 82 against at least a portion of the wall of the heat exchanger tube 72 in order to produce an increased heat flow. If the door 88 is in an intermediate position, there will be a lesser pressure build-up in the exhaust gas and a lesser blowing effect (or nozzle effect) caused by nozzle pipes 82. The pressure build-up and the increase in the heat transmission in such a case is also less than that obtained in a pure pressure operation by way of pressure space 76b with the door 88 positioned so as to close off branch 84. Thus, by way of selective adjustment of door 88, stepless control of the amount of heat transmission available becomes possible with the least possible effect on the engine.

Because of the provision of nozzles 66 and 82, the heat exchangers in FIGS. 2 and 3, respectively, may be referred to as "nozzle heat exchangers".

Figure 4:
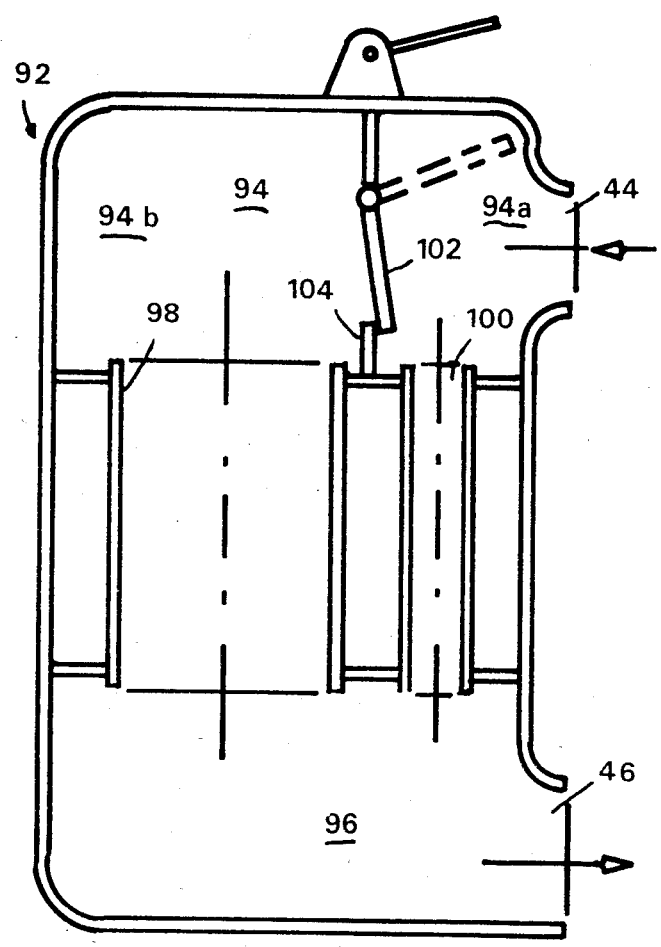
FIG. 4 is a still another diagrammatic sectional view of a heat exchanger for use in the present invention.

FIG. 4 is a view of a heat exchanger 92 including an inlet flow space 94 and an outlet flow space 96, with a large cross-section exchanger tube 98 and a small cross-section heat exchanger tube 100 extending in fluid communication between them. Inlet flow space 94 is divided by a separating wall 104 and an adjusting door or flap (damper) 102 into two space portions 94a and 94b such that the smaller space 94a adjacent the inlet 44 is in direct communication with the small cross-section heat exchanger tube 100, whereas the space portion 94b, which communicates with the large cross-section heat exchanger tube 98, is accessible only through the space portion 94a after opening the door 102.

If the door 102 is open, the two heat exchanger tubes 98 and 100 are in fluid communication with the inlet 44, resulting primarily in low velocity exhaust gas flow through the heat exchanger tube 98. If door 102 is partially or fully closed, the exhaust gas will increasingly flow through the small cross-section heat exchanger tube 100, causing a correspondingly increased pressure build-up effect and an increase in the density and the flow velocity of the exhaust gas. The pressure difference between the inlet 44 and the outlet 46 in this mode of operation as a "friction heat exchanger" will be approximately 0.1 to 5 bar, with the flow velocity being approximately 100 to 500 m/sec.

Figure 5:
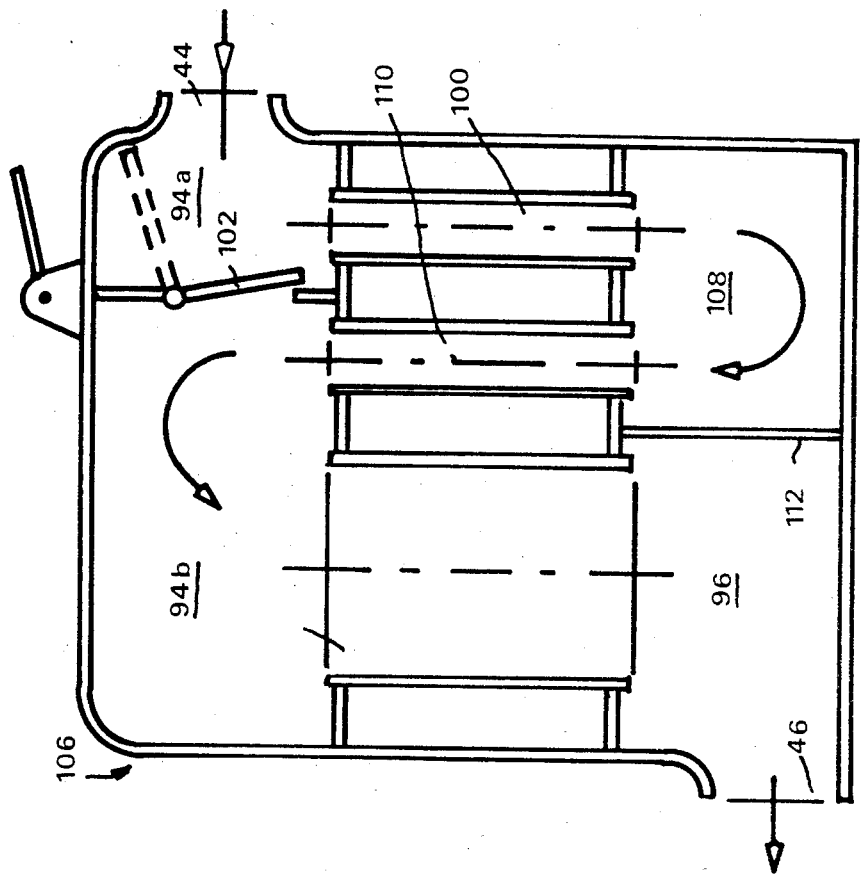
FIG. 5 is a diagrammatic sectional view of a heat exchanger that is somewhat different from that of FIG. 4.

The heat exchanger 106 of FIG. 5 is somewhat similar to the heat exchanger of FIG. 4, but has a small cross-section heat exchanger tube 100 communicating with an intermediate space 108, which is in communication with a heat exchanger tube 110, whose cross-section is the same as that of heat exchanger tube 100. The heat exchanger tube 110 discharges into the space portion 94b of the inlet flow space 94, and the intermediate space 108 is separated by way of a wall 112 from the outlet flow space 96. This design provides an especially useful effect in that at times in which a small amount of usable heat is available, a very large heat exchanger surface may be used.

Figure 6:
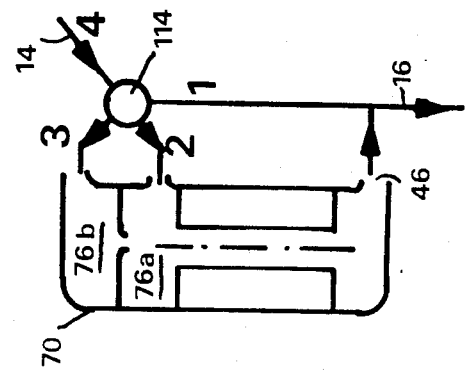
FIG. 6 is a diagrammatic view illustrating, for purposes of example, how a heat exchanger may be employed according to the present invention in the flow path of the medium giving up heat.

FIG. 6 is a diagrammatic view, generally similar to FIG. 1 but schematically illustrating the exhaust gas heat exchanger 70 (FIG. 3) in the portion of the flow path 14 corresponding to the general exhaust gas heat exchanger 42 of FIG. 1. For purposes of cutting down costs in this system, a four-way valve 114 is disposed in the flow path 14 and includes three outlets 1, 2 and 3 and an inlet 4. The valve 114 is adjusted to provide fluid communication between the inlet 4 and the outlet 1 when the back-up heating system is not in operation. Otherwise one of the outlets 2 or 3 is connected with the inlet 4, depending upon the desired heating effect of the exhaust gas heat exchanger 70, with the exhaust gas flow being by way of outlet 2 as long as a low heating effect is desired.

One skilled in the art will readily recognize that flap or door control systems described above may be automated by way of known control means. Such doors or flaps may also be replaced by bimetallic flaps in order to provide automatic control of the system. The valve 48 of FIG. 1 may also be a bimetallic flap so that at a temperature greater than a predetermined value the valve 48 is automatically opened in order to reduce the flow through the heat exchanger.

Figure 7:
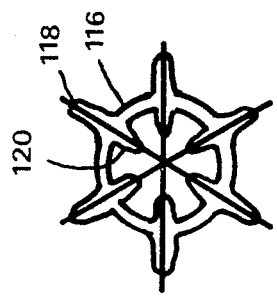
FIG. 7 is a cross-section through an optional heat exchanger tube which is especially useful in the present invention.

FIG. 7 is a cross-section through an exemplary heat exchanger tube 116, which has a ring of inwardly and outwardly extending lip-like heads or fins 118 and 120. This configuration provides a very large heat exchanger surface in relation to the cross-section of the tube.

Figure 8:
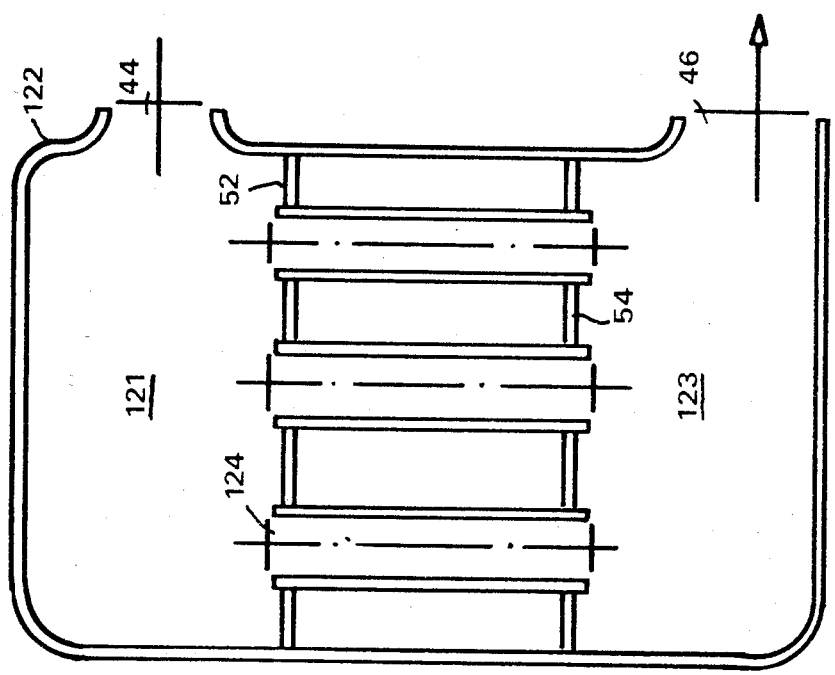
FIG. 8 is still another diagrammatic sectional view of a heat exchanger for use in the present invention.

FIG. 8 is a schematic view of a heat exchanger 122 having an inlet 44 and an outlet 46. Heat exchanger tubes 124 are supported by spacers 52 and 54 and extend between an inlet flow space 121, in communication with the inlet 44, and an outlet flow space 123, in communication with the outlet 46. The cross-section of the heat exchanger tubes 124 is sized for an exhaust gas pressure difference of approximately 0.01 to 0.5 bar (with a flow velocity of 50 to 200 m/sec.) between the inlet flow space 121 and the outlet flow space 123. For this reason, the heat exchanger 122 is an example of the intensive heat exchanger described above, which while having a relatively small overall size and a relatively low weight, gives the best possible heating effects at medium engine loading.

Figure 9:
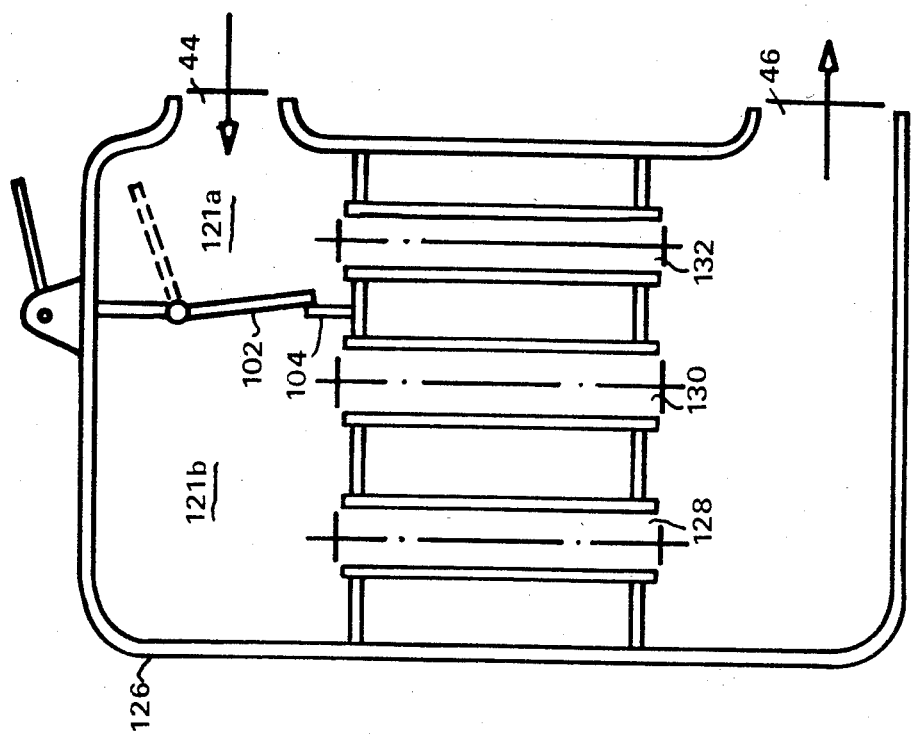
FIG. 9 is a diagrammatic sectional view of a heat exchanger similar to that of FIG. 8, although it may be switched over the pressure build-up operation.

FIG. 9 is a schematic view of an exemplary alternate embodiment of the heat exchanger illustrated in FIG. 8, with the inlet flow space 121 being walled off by a separating wall 104 and an adjusting door or flap 102 into two smaller spaces 121a and 121b, this heat exchanger being indicated by reference numeral 126.

At medium engine loading, door 102 is opened so that the exhaust gas flow distribution is through all heat exchanger tubes 128, 130 and 132, the heat exchanger 26 then acting as an intensive heat exchanger. At lower engine loads, the door 102 is closed so that all the exhaust gas flows through the heat exchanger tube 132 only. The result is such a strong decrease in the flow cross-section that tube 132 will take effect as a friction-type heat exchanger with the properties discussed above. The technically and economically useful effect of this heat exchanger is that for medium engine loading it provides, without any marked decrease in mileage, a very compact, low-price heat exchanger system that, by way of a very simple apparatus, provides the desired heating effect even at low engine load operating conditions. Furthermore, upon bypassing or turning off the heat exchanger at high engine loads, as described above in connection with FIG. 1, there is no chance of undesired effects such as overheating of the heat exchanger.

In the various heat exchanger examples discussed above, the heat exchangers have been schematically illustrated with only a small number of heat exchanger tubes for purposes of clarity and simplicity. In working forms of the heat exchangers, the number of heat exchanger tubes may vary within a wide range, as for example about 60 tubes in the case of an intensive heat exchanger, whereas a friction heat exchanger might have 6 tubes which would be twice as long. For example, in FIG. 9 the tube 132 is to be taken to be representative of a group of tubes, which together provide the necessary flow cross-section for operation as a friction heat exchanger.

It should also be noted that any of the illustrated heat exchanger systems may include a controller for bypassing the exhaust gas around the heat exchanger in conditions of operation in which there is very heavy sooting, thereby substantially avoiding heavy deposits in the heat exchangers.

Figure 10:
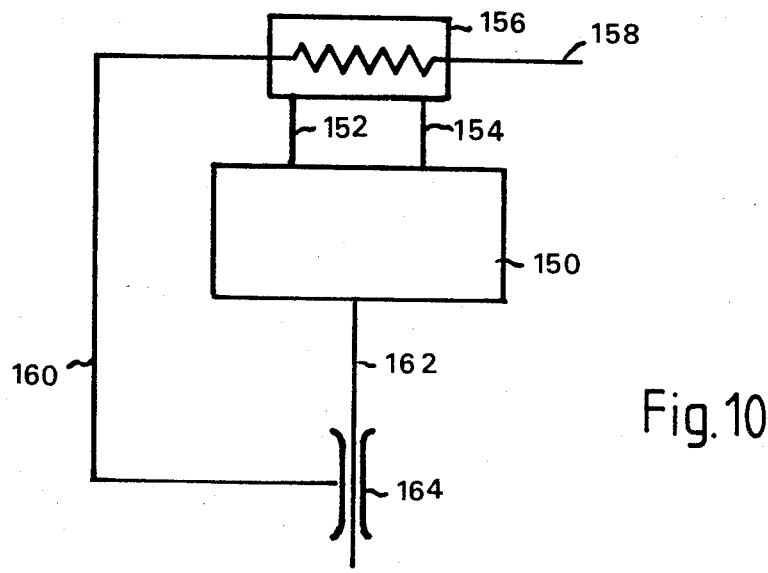
FIG. 10 is a diagrammatic view of the cooling system of an internal combustion engine with an acceleration unit for a gaseous medium used for cooling the coolant.

In the system of FIG. 10 an internal combustion engine 150 is connected by way of pipes 152 and 154 with the radiator 156, the engine coolant flowing from the engine by way of pipe 152 to the radiator 156 and then back again to the engine by way of pipe 154. For cooling the engine coolant a gaseous fluid, more particularly air, for example, is supplied by way of a pipe 158 to radiator 156. This gaseous fluid is then discharged from radiator 156 by way of pipe 160, which is connected to the aspiration connection of a jet pump disposed in the exhaust gas pipe 152 of engine 150. Because of the flow energy of the engine exhaust gas through the jet pump 164, an aspiration effect is produced for aspiration of the gaseous fluid by way of pipe 158 and pipe 160 through radiator 156 so that the flow velocity of the gaseous fluid, and thus the heat flow density, at the radiator 156 may be importantly increased.

The jet pump 164 may be bypassed by way of a pipe and valve (not shown) connected to the exhaust gas pipe 162 so that the aspiration effect of the jet pump 164 may be selectively operated when needed. Such selective operation of the jet pump 164 may be accomplished automatically, for example, using a temperature sensor in the engine coolant circuit.

Figure 11:
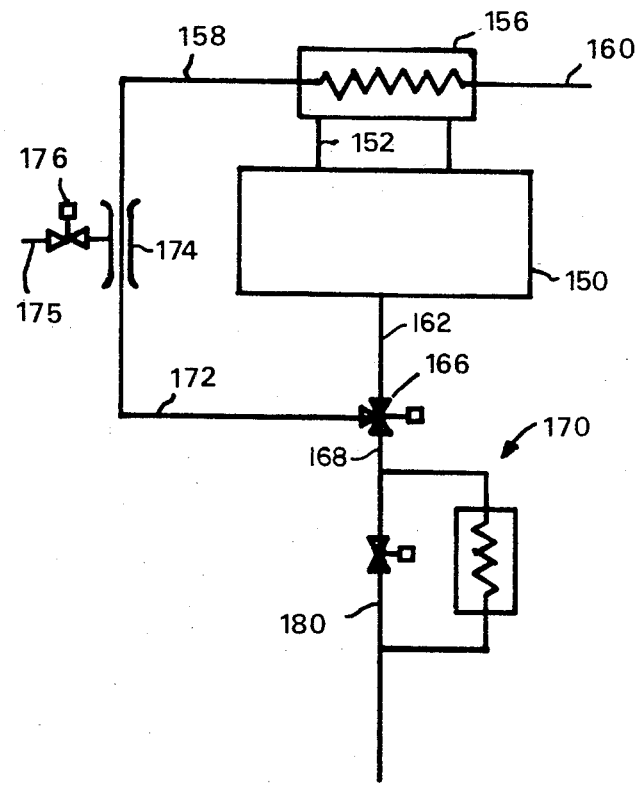
FIG. 11 is a diagrammatic view of a cooling system similar to that of FIG. 10, illustrated in connection with a waste heat exchanger for vehicle heating.

FIG. 11 is a schematic view of another system for acceleration of the gaseous fluid used for cooling the coolant, such as cooling air for example. The elements having the same function as in FIG. 10 are indicated by the same reference numerals.

The exhaust gas pipe 162 in FIG. 11 is connected to three-way valve 166, whose one outlet is connected by way of a pipe 168 with a heat exchanger system, indicated generally by reference numeral 170, for the vehicle heating. The other outlet of the valve 166 is connected by way of a pipe 172 with a jet pump 174. The aspiration connection 175 of the jet pump 174 communicates with the outside air and may, if desired, include a shut-off valve 176 as well. The outlet of the jet pump 174 is connected by way of pipe 158 with the heat exchanger 156, and discharges through pipe 160 into the outside air. The heat exchanger system 170 has a bypass pipe 180, which may be operated when desired so that the exhaust gases of the engine 150 can bypass the heat exchanger into the outside air.

In the system of FIG. 11, the three-way valve 166 may be adjusted so that the engine exhaust gas can flow to the outside air by way of the heat exchanger system 170 or, by changing the position of the three-way valve 166, can flow by way of jet pump 174 to the heat exchanger 156 in order to aspirate and take in outside air at the jet pump 174, such air being supplied at a representatively high velocity to the heat exchanger 156.

If the system of FIG. 11 is provided with a shut-off valve 176 at the aspiration connection 175, it is then possible at low engine temperatures to discontinue aspiration of outside air in order to supply the heat exchanger 156 with only engine exhaust gas by way of pipe 158. In this way, the temperature of the cooling system may be quickly changed to equal the desired operation temperature. Once the desired operation temperature has been produced, as measured by a temperature feeler or sensor, shut-off valve 176 is opened and air is aspirated in from the outside.

In order to avoid overloading the engine at high engine loading and, in order to have a large amount of engine power available for sudden acceleration, the exhaust gas pressure build-up may be measured upstream of the pressure build-up unit for purposes of turning off or bypassing the pressure build-up unit if the pressure build-up exceeds a predetermined given value. In such a case the pressure build-up unit may only be used again when the pressure build-up produced thereby has been reduced substantially at least down to zero. Furthermore, an automatic pressure limiter may optionally be provided for limiting the pressure build-up to a predetermined maximum value.

I claim:

1. A method for transferring heat from a gaseous fluid to a first fluid in a fluid flow system including at least a first fluid in a first flow path, and a second fluid in a second flow path, at least said second fluid being a gaseous fluid, comprising the steps of providing a heat transfer means fior transferring heat from the gaseous fluid to the first fluid, providing a pressure build-up means, increasing the pressure of the gaseous fluid using said pressure build-up means in order to increase the heat flow density thereof, thereby increasing the amount of heat transferred to the first fluid as said pressure is increased, and selectively placing said pressure build-up means into or out of operation.

2. The invention according to claim 1, wherein said heat transfer means includes at least first and second heat exchanger means connected in parallel in said second flow path, said second heat exchanger means including said pressure build-up means.

3. The invention according to claim 2, further comprising the steps of providing a damper means and operating said damper means for selectively directing the flow of the gaseous fluid through substantially only said second heat exchanger means or through both of said first and second heat exchanger means.

4. The invention according to claim 2, further comprising the steps of providing a bypass means and providing a four-way valve means in the second flow path, said four-way valve means including a a gaseous fluid inlet and three outlets, a first of said outlets being connected to said bypass means for bypassing said heat transfer means, a second of said outlets being connected to said heat transfer means such that the gaseous fluid is directed through both of said first and second heat exchanger means, and a third of said outlets being connected to said heat transfer means such that the gaseous fluid is directed substantially only through said second heat exchanger means.

5. The invention according to claim 1, wherein said heat transfer means includes at least first and second heat exchanger means connected in series in said second flow path, said second heat exchanger means including said pressure build-up means.

6. The invention according to claim 5, further comprising the step of providing a selectively operable damper means for selectively directing the gaseous fluid either serially through both of said heat exchanger means or through substantially only said first heat exchanger means.

7. The invention according to claim 1, wherein said heat transfer means includes a gaseous fluid inlet, a gaseous fluid outlet, and at least one heat transfer surface separating said first fluid from the gaseous fluid, said pressure build-up means including nozzle means disposed generally on the gaseous fluid inlet side of said heat transfer means for increasing the flow velocity of the gaseous fluid and for directing the gaseous fluid flow toward at least a portion of said heat transfer surface.

8. The invention according to claim 7, wherein said step for selectively placing said pressure build-up means into or out of operation is accomplished by selectively moving said nozzle means into or out of the flow path of said gaseous fluid through said heat transfer means.

9. The invention according to claim 7, further comprising the step of providing a selectively operable damper means for selectively directing the gaseous fluid flow through or around said nozzle means before the gaseous fluid contacts said heat transfer surface, thereby providing said step of selectively placing said pressure build-up means into or out of operation.

10. The invention according to claim 7, further comprising the steps of providing a bypass means and providing a four-way valve means in the second flow path, said four-way valve means including a gaseous fluid inlet and three outlets, a first of said outlets being connected to said bypass menas for bypassing said heat transfer means, a second of said outlets being connected to said nozzle means, and a third of said outlets being connected to said heat transfer means such that the gaseous fluid flows over said heat transfer surface in contact therewith without first flowing through said nozzle means.

11. The invention according to claim 1, further comprising providing selectively operable bypass means for substantially preventing the gaseous fluid from flowing through said pressure build-up means.

12. The invention according to claim 1, wherein said heat transfer means includes said pressure build-up means, and further comprising the step of providing selectively operable bypass means for substantially preventing the gaseous fluid flow from flowing through said heat transfer means.

13. The invention according to claim 1, wherein said pressure build-up means is disposed in said second flow path downstream of said heat transfer means.

14. In a motor vehicle having an internal combustion engine, an exhaust system for conveying exhaust gas from the engine, a fluid coolant system for cooling the engine, a vehicle interior heating system including means for transferring heat from the fluid coolant to the vehicle interior, the improvement comprising heat transfer means for transferring heat from the exhaust gas to the fluid coolant, pressure build-up means for increasing the pressure of the exhaust gas in order to increase the heat flow density thereof, thereby increasing the amount of heat transferred to the fluid coolant, and selective operation means for selectively placing said pressure build-up means into or out of operation.

15. The invention according to claim 14, wherein said heat transfer means comprises at least first and second heat exchanger means connected in parallel in the exhaust system, said second heat exchanger means including said pressure build-up means.

16. The invention according to claim 15, wherein said selective operation means includes damper means for selectively directing the flow of the exhaust gas through substantially only said second heat exchanger means or through both of said first and second heat exchanger means.

17. The invention according to claim 16, further comprising selectively operable bypass means for substantially preventing the exhaust gas from flowing through said heat transfer means.

18. The invention according to claim 15, wherein said selective operation means includes four-way valve means in the exhaust system, said four-way valve means including an exhaust gas inlet and three outlets, a first of said outlets being connected to bypass means for bypassing said heat transfer means, a second of said outlets being connected to said heat transfer means such that the exhaust gas is directed through both of said first and second heat exchanger means, and a third of said outlets being connected to said heat transfer means such that the exhaust gas is directed substantially only through said second heat exchanger means.

19. In a fluid flow system including at least a first fluid in a first flow path, and a second fluid in a second flow path, at least said second fluid being a gaseous fluid, the improvement comprising heat transfer means for transferring heat from the gaseous fluid to the first fluid, said heat tranfer means comprises at least first and second heat exchanger means connected in parallel in said second flow path, pressure build-up means within said second heat exchanger means for increasing the pressure of the gaseous fluid in order to inrease the heat flow density thereof, thereby increasing the amount of heat transferred to the first fluid, and selective operation means for selectively placing said pressure build-up means into or out of operation, said selective operation means includes damper means for selectively directing the flow of the gaseous fluid through substantially only said second heat exchanger means or through both of said first and second heat exchanger means.

* * * * *

UNITED STATES PATENT AND TRADEMARK OFFICE
CERTIFICATE OF CORRECTION

PATENT NO. : 4,593,749

DATED : June 10, 1986

INVENTOR(S) : Oskar Schatz

It is certified that error appears in the above-identified patent and that said Letters Patent is hereby corrected as shown below:

Column 1, line 27, "system" should be --systems--.
Column 1, line 58, "usuable" should be --usable--.
Column 4, line 39, "eating" should be --heating--.
Column 5, line 53, "and" (first occurrence in patent) should be --to--.
Column 6, line 28, delete "a".(*)
Column 7, line 10, "34" should be --24--.
Column 8, line 14, "point" should be --points--.
Column 8, line 32, after "inlet" insert --and outlet--.
Column 8, line 41, "seat" should be --seated--.
Column 13, line 24, claim 4, delete "a" (second occurence in patent).
Column 14, line 4, claim 10, "menas" should be --means--.
Column 15, line 5, claim 19, "inrease" should be --increase--.

Signed and Sealed this

Third Day of March, 1987

Attest:

DONALD J. QUIGG

Attesting Officer

Commissioner of Patents and Trademarks